United States Patent [19]

Lucia

[11] 4,306,966
[45] Dec. 22, 1981

[54] HEAT CONTROLLED FILTER BY-PASS

[75] Inventor: Carroll J. Lucia, Suamico, Wis.

[73] Assignee: Claude A. Patalidis, Lathrup Village, Mich.

[21] Appl. No.: 178,037

[22] Filed: Aug. 14, 1980

[51] Int. Cl.³ ..................... B01B 27/10; B01B 35/06
[52] U.S. Cl. ................................. 210/85; 210/149; 210/168
[58] Field of Search ............... 210/85, 132, 133, 167, 210/168, 149, 108

[56] References Cited

U.S. PATENT DOCUMENTS

| | | | |
|---|---|---|---|
| 2,389,595 | 11/1943 | Sharples | 210/149 |
| 2,529,698 | 11/1950 | Julius | 210/149 |
| 3,127,255 | 3/1964 | Winglow | 210/168 X |
| 3,463,729 | 8/1969 | Bean | 210/168 X |
| 3,790,931 | 2/1974 | Levearuy | 210/133 X |
| 4,033,870 | 7/1977 | Parquet | 210/149 X |

*Primary Examiner*—John Adee

*Attorney, Agent, or Firm*—Hauke and Patalidis

[57] ABSTRACT

A heat responsive by-pass flow circuit for a fluid flow system passive element, such as the filter element normally connected in series from an inlet to an outlet. The filter element is provided with a head block or housing having a by-pass passageway between the filter element inlet and outlet, such by-pass passageway being normally closed by a spring loaded valve. A solenoid actuates the valve to open the by-pass passageway under the control of a heat controlled switch having a temperature sensitive element disposed in the flow of fluid at the inlet to the filter element. The heat temperature controlled switch is adjusted to open the by-pass at a pre-set temperature of the fluid flowing into the inlet to the filter element, such as to cause increased direct flow of fluid from a cooler to a working element of the system and back to the cooler, thus reducing overheating of the fluid due to slow fluid flow through the system caused by excessive pressure drop across the passive element.

5 Claims, 1 Drawing Figure

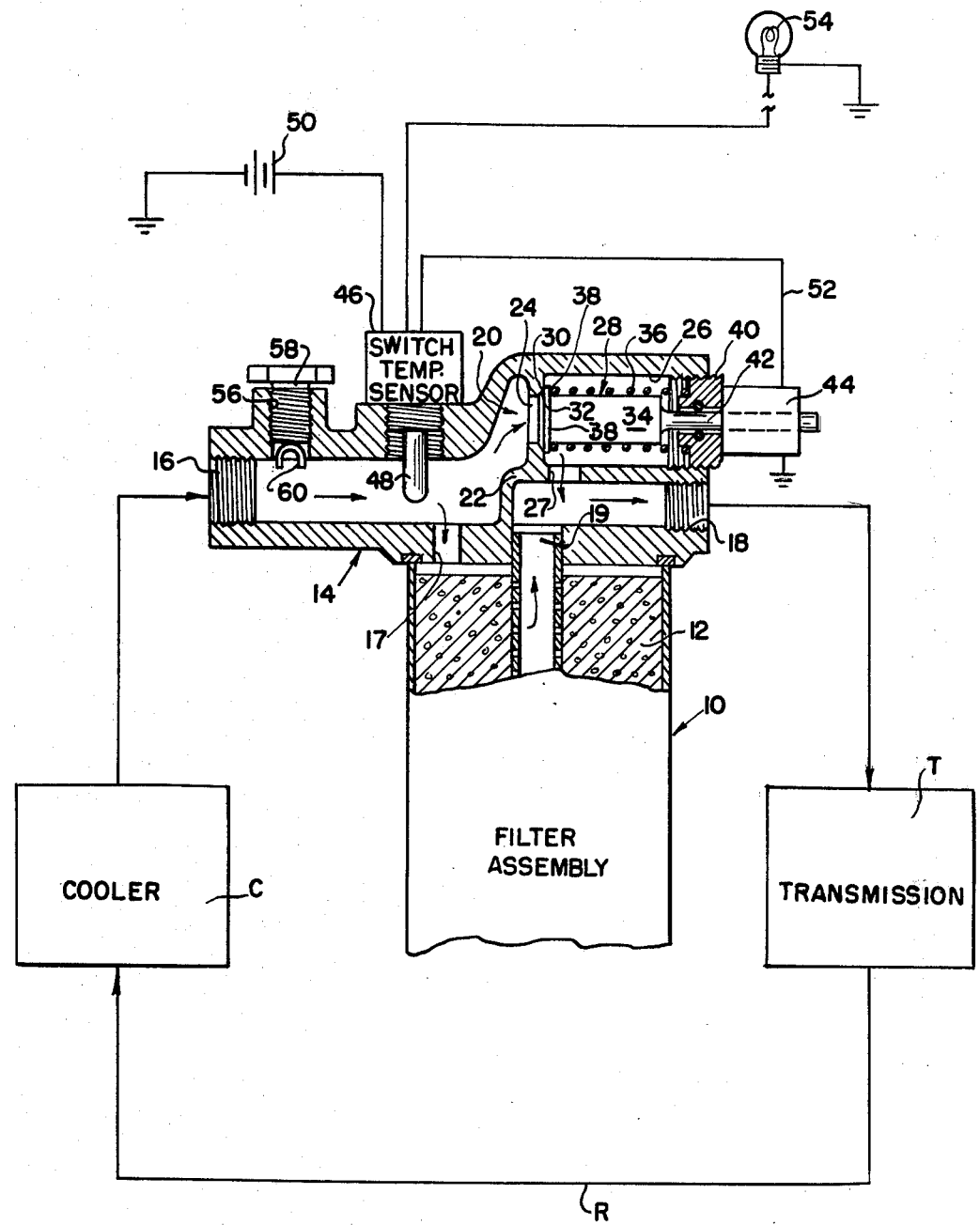

HEAT CONTROLLED FILTER BY-PASS

BACKGROUND OF THE PRESENT INVENTION

The present invention relates to a manifolding structure providing a by-pass passageway for a fluid flowing through an element such as a fluid filter upon detection of excessive fluid heat at the inlet of the element.

There are many fluid operated devices wherein a working fluid constantly flows into an operating device which causes heating of the fluid, the fluid being subsequently circulated through a cooler from which it is returned to the operating device. Such an arrangement may be used in internal combustion engines or machinery lubrication systems, and more particularly such an arrangement is provided in fluid clutches and automatic transmissions, such as automobile and truck automatic transmissions and the like. In fluid clutch and automatic transmission installations, a working fluid is caused to flow through a filtering element disposed between an outlet from the cooler and an inlet into the clutch or transmission housing. The filtering element is designed to remove from the fluid metallic and non-metallic particles, ashes, residues and other contaminants. The filter element causes a pressure drop which in turn decreases the flow of fluid from the cooler to the clutch or transmission housing and back to the cooler, even though the filter element may be substantially clean and unclogged. With usage, the pressure drop across the filtering element increases, because of progressive clogging of the element, which further reduces the flow of fluid through the cooler. This in turn causes overheating of the fluid, loss of applied pressures to the co-operating elements of the clutch or transmission, and a high incidence of major failure of mechanical components of the clutch or transmission. Even when the filter element is relatively new, thus offering a minimum amount of resistance to the passage of fluid therethrough, overload such as caused by pulling an excessively heavy trailer or overloading a truck or trailer, or lengthy hill-climbing under load, causes overheating of the transmission fluid, the overheating being further increased due to the pressure drop across the filtering element that reduces the fluid flow rate through the cooler.

SUMMARY OF THE INVENTION

The present invention remedies the problems resulting from overheating of a working fluid, more particularly the fluid used to operate a clutch or a torque converter transmission wherein the fluid is normally caused to flow through a filtering element between a cooler and the working portion of the clutch or transmission, by providing a by-pass of the filtering element when the fluid at the inlet of the filtering element is at a temperatures higher than a predetermined temperature, thus substantially increasing the flow rate of the fluid being transferred between the cooler and the clutch or transmission. According to the present invention, the by-pass takes the form of a short-circuiting passageway in the filter manifold or header which is normally closed by a valve operated by a solenoid activated by a switch having a heat responsive control element disposed in the flow of fluid at the inlet of the manifold or header. In addition, the present invention contemplates providing a visual or audible indication of the overheated state of the fluid.

These and other objects of the present invention will become apparent to those skilled in the art when the following description of the best mode contemplated for practicing the invention is read in conjunction with the accompanying drawing wherein:

BRIEF DESCRIPTION OF THE DRAWING

The FIGURE represents a schematic section through a filter element manifold or header provided with a heat controlled by-pass according to the present invention.

DETAILED DESCRIPTION OF THE PREFERRED EMBODIMENT

Referring now to the FIGURE of the drawing, a filter assembly 10 containing a filtering element 12 is provided with a manifold or header in the form of a head block or housing 14 having an inlet 6 normally connected to the outlet of a cooler C, and an outlet 18 normally connected to a fluid clutch or transmission housing T, as is well known in the art. A return line R returns the fluid heated by passage through the fluid clutch or transmission from the clutch or transmission housing T to the cooler C. The fluid normally flows from the inlet 16 in the head block or housing 14 to the outlet 18 through the filtering element 12, an inlet port 17 being provided in the housing 14 for providing flow of the fluid into the filtering element from which the fluid, after filtration, is returned to the housing 14 through an outlet port 19 proximate the housing outlet 18. The filtering element 12 is replaceable and is contained in a housing or filter assembly 10 mounted below the head block or housing 14 by means well-known in the art.

According to the present invention, a normally closed by-pass passageway 20 is provided between the inlet 16 and the outlet 18 in the filter head block or housing 14 which are normally separated by a partition wall 22. The partition wall 22 has an opening 24 leading into a cylindrical cavity or bore 26, the cylindrical cavity or bore 26 being provided through its wall with a port 27 placing the cylindrical cavity or bore 26 in fluid communication with the outlet 18. A valve 28 is reciprocably disposed in the cylindrical cavity or bore 26. The valve 28 has a frusto-conical annular face 30 engageable with a corresponding tapered annular seat 32 at the edge of the opening 24 in the cylindrical cavity or bore 26, and a stem 34 around which is disposed a coil spring 36 normally urging the valve face 30 in engagement with the seat 32. The coil spring is held in compression between an annular shoulder 38 at the forward end of the valve stem 34 and a closure cap 40 fastened in the open end of the cylindrical cavity or bore 26. The rear end of the valve stem or body 34 is provided with an integral rod 42 passing through a solenoid 44 such that when the solenoid is actuated, the valve 28 is displaced in a direction urging the valve face 30 away from the seat 32, against the biasing action of the spring 36, and thus placing the inlet 16 of the head block or housing 14 in fluid communication with the outlet 18 through the partition wall opening 24, the cylindrical cavity or bore 26 and the port 27.

A heat actuated switch 46 is mounted exteriorly to the head block or housing 14 and has a temperature sensitive control element 48 projecting into the fluid flowing from the inlet 16 into the head block or housing 14. The heat actuated switch 46, which is normally open, is connected in series between the ungrounded terminal of a power supply 50, such as the battery or generator output of a motor vehicle, and the solenoid 44 through a line 52, such that when the temperature sensitive element 48, which is pre-set for a predetermined temperature, controls the switch 46 to close, the solenoid 44 is activated and the valve 28 opens the by-pass opening 20 for direct flow of the fluid from the inlet 16 to the outlet 8 through the cylindrical cavity or bore 26 and the port 27, thus shunting or short-circuiting the filter element. At the same time that the heat activated switch 46 closes, a parallel electrical circuit through an indicating light bulb 54 is closed for giving a visual alarm of overheating of the fluid. Instead of a visual indicator or light bulb 54, or in addition thereto, an audible signal may be provided, operated by the heat actuated switch 46.

Proximate the inlet 16 of the filter head block or housing 14, a threaded aperture 56 is obturated by a plug 58 provided at each end in contact with the circulating fluid with a permanent magnet 60 for attracting any magnetic metallic particle in suspension in the fluid.

It is readily apparent from the description of the illustrated structure embodying the present invention that upon detection by the heat sensitive element 48 of excessive temperature in the fluid flowing through the filter head block or housing 14 from the fluid cooler C beyond a pre-set threshhold temperature, the switch 46 is operated to close, thus actuating the solenoid 44 and opening the valve 28 to short-circuit the fluid flow through the filter head block or housing 14 directly from the inlet 16 to the outlet 18 through the by-pass passageway 20. Thus the fluid flows directly from the cooler C to the transmission housing T with little flow, if any, through the filter element 12. This results in increased fluid flow through the system and therefore increased fluid flow through the cooler C, which in turn tends to reduce the temperature of the fluid. Upon the temperature of the fluid at the inlet 16 of the filter head block or housing 14 dropping below the pre-set threshhold temperature value, the switch 46 opens, thus deactivating the solenoid 44 and causing return of the valve face 30 in engagement with the valve seat 32. Fluid is no longer allowed to by-pass the filter element 12, and normal operation of the filtering element is reinstated. At the same time that normal operation of the system is reinstated, the visual indicator 54 which had been turned on when the switch 46 was closed has now been turned off.

Having thus described the present invention by way of an example of particular structure given for illustrative purpose only, modifications thereof will be apparent to those skilled in the art, what is claimed as novel is as follows:

1. In a fluid flow system wherein fluid flows from a fluid cooler to a fluid utilization mechanism through a filtering element causing a pressure drop in said fluid flow system, said filtering element having an inlet and an outlet, and said filtering element being provided with a manifold having an inlet connected to said cooler and an outlet connected to said utilization mechanism, the improvement comprising a first passageway in said manifold connecting the inlet of said manifold to the inlet of said filtering element, a second passageway in said manifold connecting the outlet of said filtering element to the outlet of said manifold, a partition separating said first passageway from said second passageway, an aperture in said partition, a valve normally obturating said aperture, a solenoid for actuating said valve to a position opening said aperture, a heat sensitive element disposed in said first passageway proximate the inlet of said manifold, and a normally open switch operable by said heat sensitive element, whereby when said fluid at the inlet of said manifold reaches a predetermined high temperature, said heat sensitive element closes said switch for energizing said solenoid to operate said valve for opening said aperture and thereby placing said inlet and said outlet in direct flow communication by-passing said filtering element.

2. The improvement of claim 1 further comprising alarm means operated by said switch when closed.

3. The improvement of claim 1 further comprising a plug provided with a permanent magnet disposed in said manifold proximate said inlet.

4. The improvement of claim 2 further comprising a plug provided with a permanent magnet disposed in said manifold proximate said inlet.

5. The improvement of claim 1 wherein said manifold comprises a substantially cylindrical cavity in which is disposed said valve, said valve having a frusto-conical face normally engaged with a corresponding seat in said partition, an orifice in said cylindrical cavity placing said cylindrical cavity in fluid communication with said second passageway, and biasing means normally urging said valve face in engagement with said seat.

* * * * *

UNITED STATES PATENT AND TRADEMARK OFFICE
CERTIFICATE OF CORRECTION

PATENT NO. : 4,306,966

DATED : December 22, 1981

INVENTOR(S) : Carroll J. Lucia

It is certified that error appears in the above-identified patent and that said Letters Patent are hereby corrected as shown below:

Column 2, line 16, change "6" to --16--.

Column 3, line 6, change "8" to --18--.

Signed and Sealed this

Thirtieth Day of March 1982

|SEAL|

Attest:

Attesting Officer

GERALD J. MOSSINGHOFF

Commissioner of Patents and Trademarks